J. J. Gish.
Hog Snout Slitter.
No. 75148    Fig. 1.    PATENTED MAR 3 1868
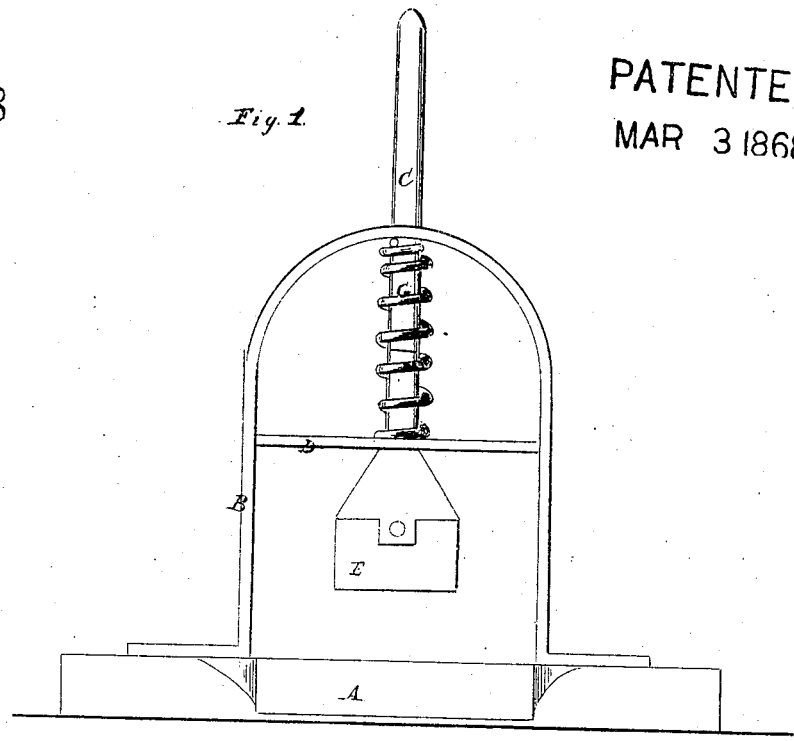
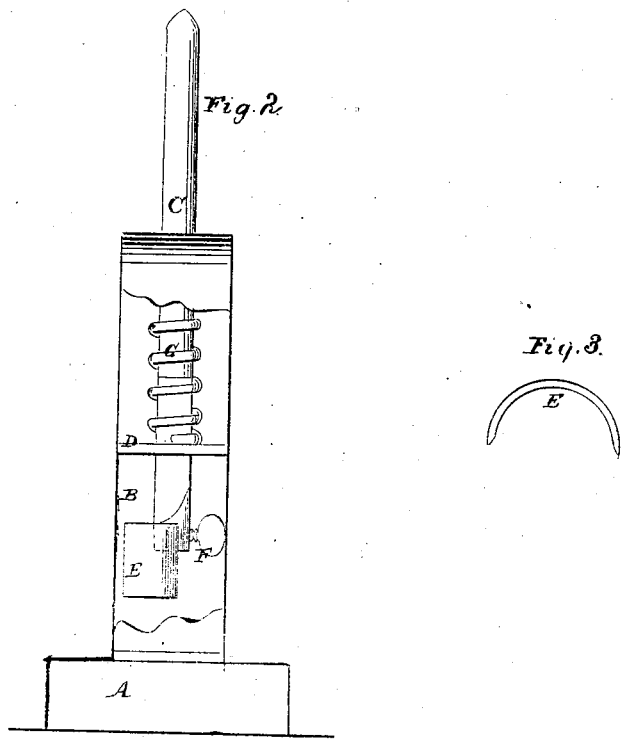
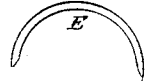
Fig. 3.
Inventor
J. J. Gish
Witnesses
J. H. Burridge
J. Holmes

United States Patent Office.

JOHN J. GISH, OF MILTON, OHIO.

Letters Patent No. 75,148, dated March 3, 1868.

IMPROVEMENT IN HOG-SNOUT SLITTER.

*The Schedule referred to in these Letters Patent and making part of the same.*

TO ALL WHOM IT MAY CONCERN:

Be it known that I, JOHN J. GISH, of Milton, in the county of Wayne, and State of Ohio, have invented certain new and useful Improvements in Hog-Snout Slitter; and I do hereby declare that the following is a full and complete description of the same, reference being had to the accompanying drawings, making a part of this specification, in which—

Figure 1 is a front view of the slitter.

Figure 2 is a side view.

Figure 3 is a detached section.

Like letters of reference refer to like parts in the views.

In fig. 1, A is a block of wood, to which is secured the frame or bow B. In this frame is loosely fitted a shaft or stem, C, and held in a vertical position, and in place, by the cross-bar D. The lower end of the stem is armed with a curved cutting-blade, E, fig. 3, and secured to the same by the thumb-screw F. G is a spring, coiled around the stem above the cross-bar, and by which said stem and blade are held in the position shown in the drawing.

The purpose of this implement is to cut a slit around in the cartilaginous rim of a hog's snout without breaking or removing any part of the same, and thereby prevent the animal from rooting. This natural disposition of the hog is well known, and to prevent it from an exercise of this disposition, a ring is sometimes thrust through the nose of the animal. This, for a time, is an effectual estoppel to its rooting. After some time, however, by the frequent contact of the ring with the ground and trough, while the animal is feeding, and also by the natural renewal of the growth of the hog, the ring either is torn out from the nose, or grows out, which requires to be replaced, which, if the animal is a large one, is attended with much trouble.

It has been found that when an incision is made through the cartilage of the nose, and around in the direction of its curvature, so that the outer edge of the rim of the nose thus cut through is not detached, the hog cannot root; the incision will heal without uniting, and thereby leave a piece of the nose free or loose, which effectually prevents the hog from rooting. The usual way of making this incision is by thrusting a sharp-pointed knife through, and then cutting around in the proper direction. This operation is frequently unsuccessful, for the reason that the struggles of the animal will cause the operator to cut through the edge or rim of the snout, in which case the animal is mutilated and hurt, without accomplishing the desired results.

By the use of this slitter, this failure cannot take place, for the entire incision is made at once, as follows: The slitter is placed on the animal's face so as to bring the front of the nose against the block A, and the blade, which is curving, to rest upon the snout back of the rim. When in this position a slight, quick blow on the end of the stem will drive the blade through the cartilaginous rim, without danger of failure.

What I claim as my improvement, and desire to secure by Letters Patent, is—

The herein-described slitter, consisting of the frame B, bar D, stem C, spring G, blade E, and block A, all constructed and arranged to operate in the manner and for the purpose specified.

JOHN J. GISH.

Witnesses:
W. H. BURRIDGE,
J. HOLMES.